(12) United States Patent
Park et al.

(10) Patent No.: US 10,760,351 B2
(45) Date of Patent: Sep. 1, 2020

(54) COUPLING MECHANISM FOR DRIVESHAFT TRANSMISSION ASSEMBLY

(71) Applicant: Halliburton Energy Services, Inc., Houston, TX (US)

(72) Inventors: Steven W. Park, Edmonton (CA); Geoffrey A. Samuel, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 178 days.

(21) Appl. No.: 15/556,671

(22) PCT Filed: Apr. 17, 2015

(86) PCT No.: PCT/US2015/026283
§ 371 (c)(1),
(2) Date: Sep. 8, 2017

(87) PCT Pub. No.: WO2016/167786
PCT Pub. Date: Oct. 20, 2016

(65) Prior Publication Data
US 2018/0058151 A1    Mar. 1, 2018

(51) Int. Cl.
*E21B 17/03* (2006.01)
*F16D 1/08* (2006.01)
(Continued)

(52) U.S. Cl.
CPC ............... *E21B 17/03* (2013.01); *E21B 4/00* (2013.01); *E21B 4/003* (2013.01); *E21B 4/02* (2013.01); *F16D 1/08* (2013.01)

(58) Field of Classification Search
CPC . E21B 17/03; E21B 4/003; E21B 4/02; E21B 4/00; F16D 1/08
(Continued)

(56) References Cited

U.S. PATENT DOCUMENTS

| 1,293,617 A | 2/1919 | Obertop |
| 2,016,067 A * | 10/1935 | Bannister ................. E21B 4/02 |
| | | 175/106 |

(Continued)

FOREIGN PATENT DOCUMENTS

| AR | 103224 | 4/2017 |
| CA | 2970134 | 8/2016 |

(Continued)

OTHER PUBLICATIONS

Chinese Patent Application No. 201580077861.2, Office Action, dated Aug. 31, 2018, 12 pages.

(Continued)

*Primary Examiner* — Greg Binda
(74) *Attorney, Agent, or Firm* — Kilpatrick Townsend & Stockton LLP

(57) ABSTRACT

A driveshaft transmission assembly may include a coupling mechanism for coupling a radial bearing assembly to a driveshaft. The coupling mechanism may include a bearing cap for creating an interference fit with a downhole portion of the radial bearing assembly. The coupling mechanism may include locking pins and a retention sleeve to retain the locking pins in grooves of the driveshaft and openings in the radial bearing sleeve. The radial bearing assembly may include a catch mechanism for preventing the loss of certain driveshaft transmission assembly components downhole in the event of a failure of the driveshaft transmission. The coupling mechanism may prevent the loss of the driveshaft downhole subsequent to separation of certain driveshaft transmission assembly components.

20 Claims, 7 Drawing Sheets

(51) Int. Cl.
*E21B 4/00* (2006.01)
*E21B 4/02* (2006.01)

(58) Field of Classification Search
USPC ......... 464/178; 175/106; 384/195, 537, 584, 384/585
See application file for complete search history.

(56) References Cited

U.S. PATENT DOCUMENTS

| | | | |
|---|---|---|---|
| 2,022,355 A | 11/1935 | Klausmeyer | |
| 4,806,028 A * | 2/1989 | Miller | F16C 35/063 384/537 |
| 4,924,948 A | 5/1990 | Chuang et al. | |
| 5,125,148 A | 6/1992 | Krasnov | |
| 5,711,205 A | 1/1998 | Wolfer et al. | |
| 5,769,166 A | 6/1998 | Duke | |
| 7,063,175 B1 | 6/2006 | Kerstetter | |
| 7,445,061 B1 | 11/2008 | Falgout, Sr. et al. | |
| 7,985,037 B2 | 7/2011 | Duggan | |
| 7,987,930 B2 | 8/2011 | Purcell | |
| 8,025,110 B2 | 9/2011 | Falgout, Jr. et al. | |
| 8,100,200 B2 | 1/2012 | Wolfer | |
| 8,852,004 B2 | 10/2014 | D'Silva | |
| 2005/0173155 A1 | 8/2005 | Nevlud et al. | |
| 2008/0185187 A1 | 8/2008 | Scott et al. | |
| 2010/0187013 A1 | 7/2010 | Falgout, Jr. et al. | |
| 2010/0187016 A1 | 7/2010 | Marshall et al. | |
| 2010/0314172 A1 | 12/2010 | Underwood et al. | |
| 2012/0314172 A1 | 12/2012 | Oohira | |
| 2013/0133952 A1 | 5/2013 | Purcell | |
| 2013/0186692 A1 | 7/2013 | Purcell | |
| 2013/0213129 A1 | 8/2013 | Kumar et al. | |
| 2013/0213661 A1 | 8/2013 | Reimert et al. | |
| 2014/0202707 A1 | 7/2014 | Howell et al. | |
| 2017/0343046 A1 | 11/2017 | Park et al. | |

FOREIGN PATENT DOCUMENTS

| | | |
|---|---|---|
| CA | 2970134 | 4/2019 |
| CN | 2046538 | 10/1989 |
| CN | 201087694 | 7/2008 |
| CN | 101305156 | 11/2008 |
| CN | 201714293 | 1/2011 |
| CN | 201843518 | 5/2011 |
| CN | 201902163 | 7/2011 |
| CN | 201963191 | 9/2011 |
| CN | 102268961 | 12/2011 |
| CN | 202882790 | 4/2013 |
| CN | 203145852 | 8/2013 |
| CN | 204511289 | 7/2015 |
| CN | 107109908 | 11/2019 |
| GB | 2547382 | 5/2019 |
| NO | 20170817 | 5/2017 |
| RU | 2667366 | 9/2018 |
| SU | 802494 | 2/1981 |
| SU | 894166 | 12/1981 |
| SU | 1155711 | 5/1985 |
| WO | 2013074865 | 5/2013 |
| WO | 2014089457 | 6/2014 |
| WO | 2014126889 | 8/2014 |
| WO | 2016122468 | 8/2016 |

OTHER PUBLICATIONS

International Patent Application No. PCT/US2015/026283 , "International Search Report and Written Opinion", dated Dec. 18, 2015, 11 pages.
CA2,979,533 , "Office Action", dated Aug. 8, 2019, 3 pages.
Chinese Application No. CN201910257185.7 , "Office Action", dated Mar. 30, 2020, 7 pages.

* cited by examiner

COUPLING MECHANISM FOR DRIVESHAFT TRANSMISSION ASSEMBLY

CROSS-REFERENCE TO RELATED APPLICATIONS

This is a U.S. national phase under 35 U.S.C. 371 of International Patent Application No. PCT/US2015/026283 titled "Coupling Mechanism for Driveshaft Transmission Assembly" and filed Apr. 17, 2015, the entirety of which is incorporated herein by reference.

TECHNICAL FIELD

The present disclosure relates generally to an assembly for a driveshaft transmission and, more particularly (although not necessarily exclusively), to a coupling mechanism for a radial bearing assembly in a driveshaft transmission assembly.

BACKGROUND

Mud motors utilize fluid energy converted to mechanical energy to provide shaft rotation to a drill string or drill bit. Because the mud motor is a highly loaded section of a drilling tool, it is prone to critical damage during driveshaft transmission failure. Failure of the driveshaft transmission may result in critical damage to the transmission assembly, including the separation of components from the transmission assembly. Where such separation occurs, these components may be lost downhole. The lost components dropped downhole can prevent further progression in drilling and can cause significant delays. The loss of components downhole may even result in a drilling project being abandoned. A procedure known as "fishing" is sometimes used to retrieve the lost components, but this procedure is costly and time-consuming, and may be ineffective. A catch assembly may be included in a driveshaft transmission assembly to prevent the loss of drilling components downhole. But, preventing the loss of drilling components downhole may require components of the driveshaft transmission assembly to be directly coupled with the catch assembly or indirectly coupled with the catch assembly (e.g., coupled with a component of the driveshaft transmission assembly that is coupled with the driveshaft) to allow the catch assembly to retain the components in the event of separation.

DETAILED DESCRIPTION

Certain aspects and examples of the present disclosure relate to coupling mechanisms for a radial bearing assembly in a driveshaft transmission assembly. A coupling mechanism may be external to the driveshaft and may couple a radial bearing assembly to a driveshaft. In some aspects, the coupling mechanism may include a bearing cap positioned on the driveshaft to couple the radial bearing assembly to the driveshaft by an interference fit. In additional and alternative aspects, the coupling mechanism may include locking pins and a retention sleeve. The locking pins may be positioned in grooves of the driveshaft and openings in the radial bearing assembly. The locking pins may be retained in the grooves and openings by the retention sleeve.

The radial bearing assembly may include a catch assembly positioned on the radial bearing assembly. Subsequent to a failure of the driveshaft transmission, separation of components from the driveshaft transmission assembly may occur. The catch assembly may prevent the loss of driveshaft transmission assembly components downhole subsequent to separation. In the event of separation, the catch mechanism may interfere with a contact shoulder on a second radial bearing assembly coupled to a bearing housing. The interference by the catch assembly with the contact shoulder may allow the weight of the components coupled to the catch assembly (directly or indirectly) to be supported by the bearing housing of the driveshaft transmission assembly and prevent the loss of the components downhole. The coupling mechanism may couple the radial bearing assembly to the driveshaft to prevent the loss of the driveshaft downhole.

The use of a coupling mechanism that is external to the driveshaft for coupling the radial bearing assembly to the driveshaft may result in easier installation and disassembly of the driveshaft component than other coupling mechanisms (e.g., threading). The reduction of threaded components may also circumvent at least a portion of the heightened inspections and testing necessary for threaded components. Such inspections and testing may be both costly and time-consuming.

The terms "inner," "outer," "internal," and "between," as used in the present disclosure, may refer to a radial orientation toward or away from the center of the driveshaft transmission assembly. The terms "uphole," "downhole," and "proximate," as used in the present disclosure, may refer to an axial orientation toward or away from the surface. Each of these terms is used only to provide examples of relation and orientation of the driveshaft transmission components with respect to each other, and is not meant to limit the scope of the present disclosure.

Figure 1:
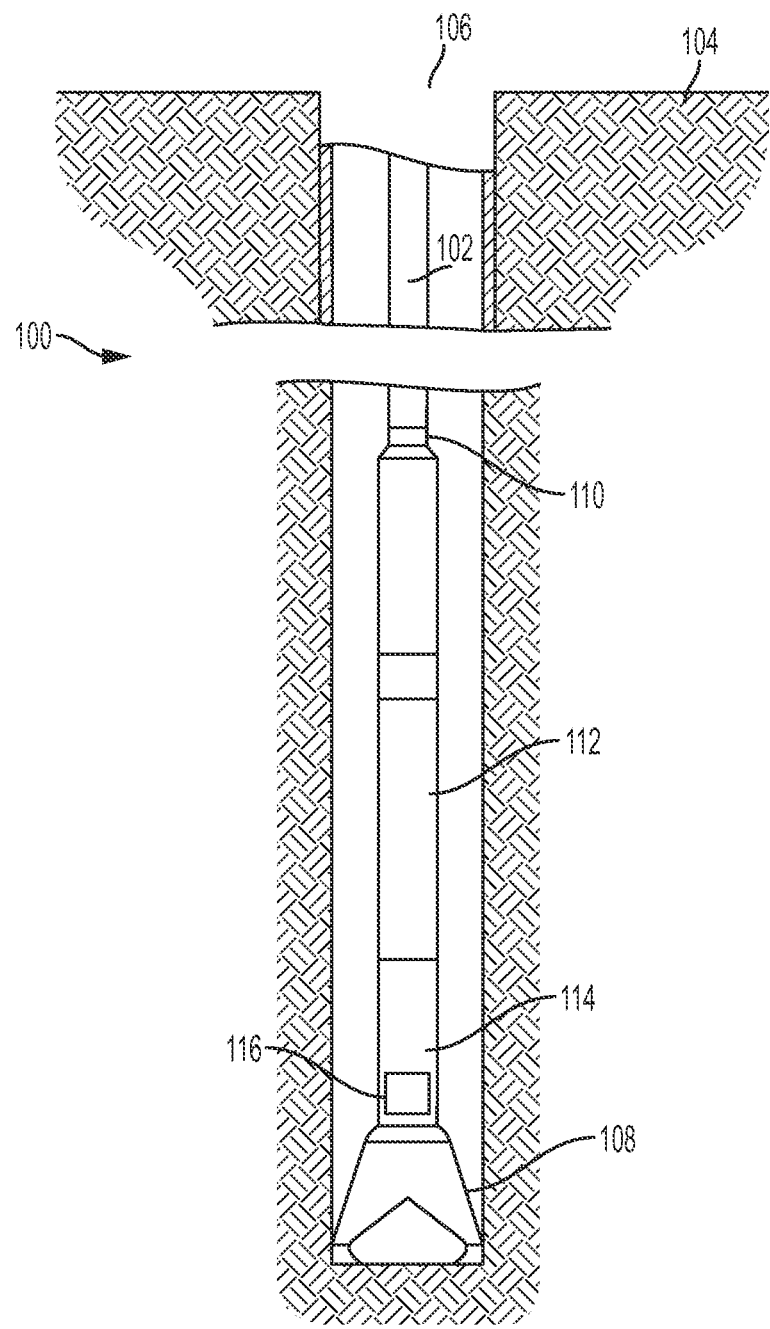
FIG. 1 is a cross-sectional schematic diagram of a drilling system that includes a driveshaft transmission assembly with a catch assembly in a lower end of a driveshaft transmission assembly according to one aspect of the present disclosure.

Various aspects of the present disclosure may be implemented in various drilling systems. FIG. 1 illustrates an example of such a drilling system 100 that includes a drill string 102. The drill string 102 of a drilling rig (not shown) may include segmented pipes that extend below the surface 104 in a borehole, such as a wellbore 106. The drill string 102 may transmit drilling fluid (or mud) and the torque necessary to operate a drill bit 108. Also, the weight of the drill string 102 and/or various components of the drilling system 100 may exert an axial force on the drill bit 108.

The drill string 102 may include a drill pipe 110 and a bottom hole assembly 112. The bottom hole assembly 112 may include various components, such as a downhole motor assembly 114 and the drill bit 108.

Though placement of the assemblies disclosed herein may vary without departing from the scope of the present subject matter, the assemblies of the present disclosure may be included in the lower end of the downhole motor assembly 114 and near the drill bit 108. For example, the driveshaft transmission assembly 116 depicted in FIG. 1 represents a placement according to one example. Placement of the assemblies as close to the drill bit 108 as possible may reduce the moment arm load induced from directional drilling. Reducing the moment arm load may result in longevity of the motor assembly and bearings of the drilling installation, and may reduce the likelihood of failure of the driveshaft transmission in the event of separation.

During operation of the driveshaft transmission assembly 116, dynamic loads may be placed on a drill motor by the action of the drill bit 108 and by vibrations of the drill string 102. In certain instances, the dynamic loads may cause the drill motor to fail and components of the driveshaft transmission assembly 116 to separate. A catch assembly may be coupled to a radial bearing assembly to retain components of the driveshaft transmission and prevent the loss of components downhole in the event of separation. The driveshaft transmission assembly 116 may include a coupling mechanism for coupling a radial bearing assembly to a driveshaft. The coupling mechanism may prevent the loss of the driveshaft in the event of separation.

Figure 2:
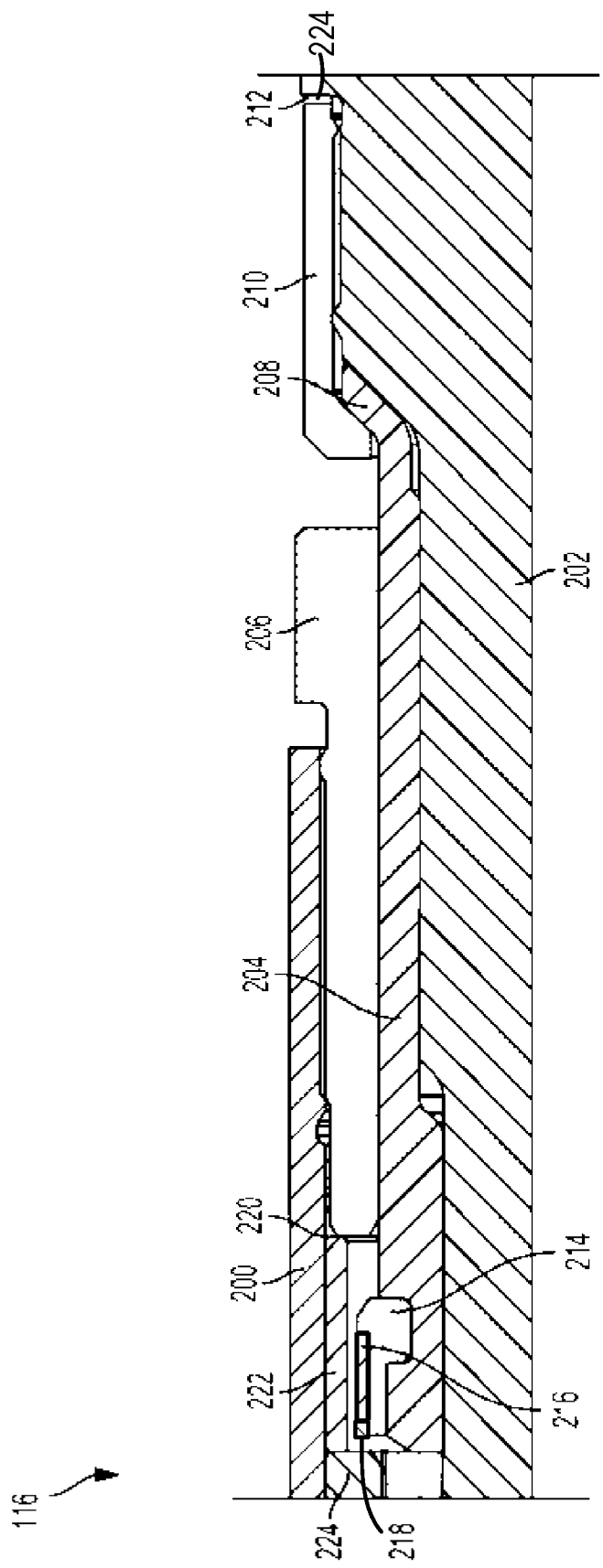
FIG. 2 is a cross-sectional view of a driveshaft transmission assembly that includes a coupling mechanism using an interference fit according to one aspect of the present disclosure.

FIG. 2 shows an example of a driveshaft transmission assembly 116 that includes a coupling mechanism using an interference fit according to one aspect of the present disclosure. The driveshaft transmission assembly 116 includes a bearing housing 200 and certain bearings for a driveshaft 202. The bearing housing 200 may support the driveshaft transmission assembly 116 and may be coupled to the drill pipe 110. The driveshaft 202 may be coupled to a motor power section that converts hydraulic energy to mechanical torque for operation of the driveshaft transmission assembly 116. One or more radial bearing assemblies may be included internal to the bearing housing 200. For example, the driveshaft transmission assembly may include a shaft radial bearing sleeve 204 and a stationary sleeve 206. The shaft radial bearing sleeve 204 may be positioned between the driveshaft 202 and the stationary sleeve 206. The stationary sleeve 206 may be coupled to the bearing housing 200.

The shaft radial bearing sleeve 204 includes a downhole portion 208 to allow the coupling mechanism to couple the shaft radial bearing sleeve 204 to the driveshaft 202. In FIG. 2, the downhole portion 208 of the shaft radial bearing sleeve 204 is shown having an angle of approximately 45° relative to the axial line of the driveshaft. But, the downhole portion 208 of the shaft radial bearing sleeve 204 may have any angle between 0° and 180°. The coupling mechanism includes a bearing cap 210. The bearing cap 210 may be coupled to the driveshaft 202. An uphole portion of the bearing cap 210 may couple the shaft radial bearing sleeve 204 to the driveshaft 202 by creating an interference fit with the downhole portion 208 of the shaft radial bearing sleeve 204. In some aspects, the interference fit is created by the uphole portion of the bearing cap 210 frictionally squeezing the downhole portion 208 of the shaft radial bearing sleeve 204 between the bearing cap 210 and the driveshaft 202. The frictional squeeze of the interference fit may be loaded high enough so that during operation of the driveshaft transmission assembly 116, the shaft radial bearing sleeve 204 may not move axially or rotate with respect to the driveshaft 202. Because the frictional force on the downhole portion 208 of the shaft radial bearing sleeve 204 is dependent on normal forces acting against the surfaces of the downhole portion 208, it may be desirable to have a high load on the downhole portion 208. In some aspects, the downhole portion 208 of the shaft radial bearing sleeve 204 may have smooth, linear surfaces as shown in FIG. 2. In additional and alternative aspects, the surfaces of the downhole portion 208 may be nonlinear to further assist the resistance of torque between the bearing cap and the driveshaft. For example, the surfaces of the downhole portion 208 may include interlocking spline features or be intentionally roughened.

When the bearing cap 210 is initially installed, there may be a gap 224 between the downhole edge of the bearing cap 210 and a downhole shoulder 212 of the driveshaft 202. After the downhole portion 208 of the shaft radial bearing sleeve 204 is loaded by assembly of the bearing cap 210, a gap 224 may intentionally remain between the downhole edge of the bearing cap 210 and a downhole shoulder 212. In some aspects, the assembly torque between the bearing cap 210 and the driveshaft 202 may be high enough that, due to a tight tolerate, the downhole portion 208 of the shaft radial bearing sleeve 204 is elastically or plastically deformed to close the gap 224.

The shaft radial bearing sleeve 204 may include a catch assembly. In some aspects, the catch assembly may be coupled to the shaft radial bearing sleeve 204. The catch assembly may include one or more split-ring shells 214 positioned in a groove in the shaft radial bearing sleeve 204 as shown in FIG. 2. The catch assembly may also include a cylindrical shell 216 coupled to the split-ring shells 214 to couple the split-ring shells 214 to the shaft radial bearing sleeve 204. The catch assembly may further include a ring 218 positioned axially adjacent to the cylindrical shell 216 on the split-ring shells 214 to prevent the cylindrical shell 216 from decoupling from the split-ring shells 214. In some aspects, the catch assembly may be separate from and independent of the bearing housing 200 and the driveshaft 202. The catch assembly may be positioned uphole of a contact shoulder 220 on the stationary sleeve 206. The catch assembly may be radially positioned between the shaft radial bearing sleeve 204 and a spacer sleeve 222. The spacer sleeve may be required to place an axial pre-load onto axial thrust bearings 224 positioned uphole of the catch assembly. The axial thrust bearings 224 may contain the driveshaft in the axial direction under normal operation of the driveshaft transmission assembly 116.

At least a portion of the catch assembly may extend beyond an outer diameter of the shaft radial bearing sleeve 204. Following a failure of the drill motor, the catch assembly may prevent certain components of the driveshaft transmission assembly 116 from falling, or being lost downhole in the event of separation. For example, when separation of the driveshaft occurs, the catch assembly may create an interference with the contact shoulder 220 of the stationary sleeve 206 to prevent the catch assembly from moving in the downhole direction beyond the contact shoulder 220. Because the catch assembly is coupled to the shaft radial bearing sleeve 204, the interference of the catch assembly with the contact shoulder 220 may prevent the shaft radial bearing sleeve 204 and any components directly or indirectly coupled thereto from falling downhole. The coupling mechanism may prevent the driveshaft 202 from falling downhole because the coupling mechanism couples the shaft radial bearing sleeve 204, retained by the catch assembly, to the driveshaft.

Figure 3:
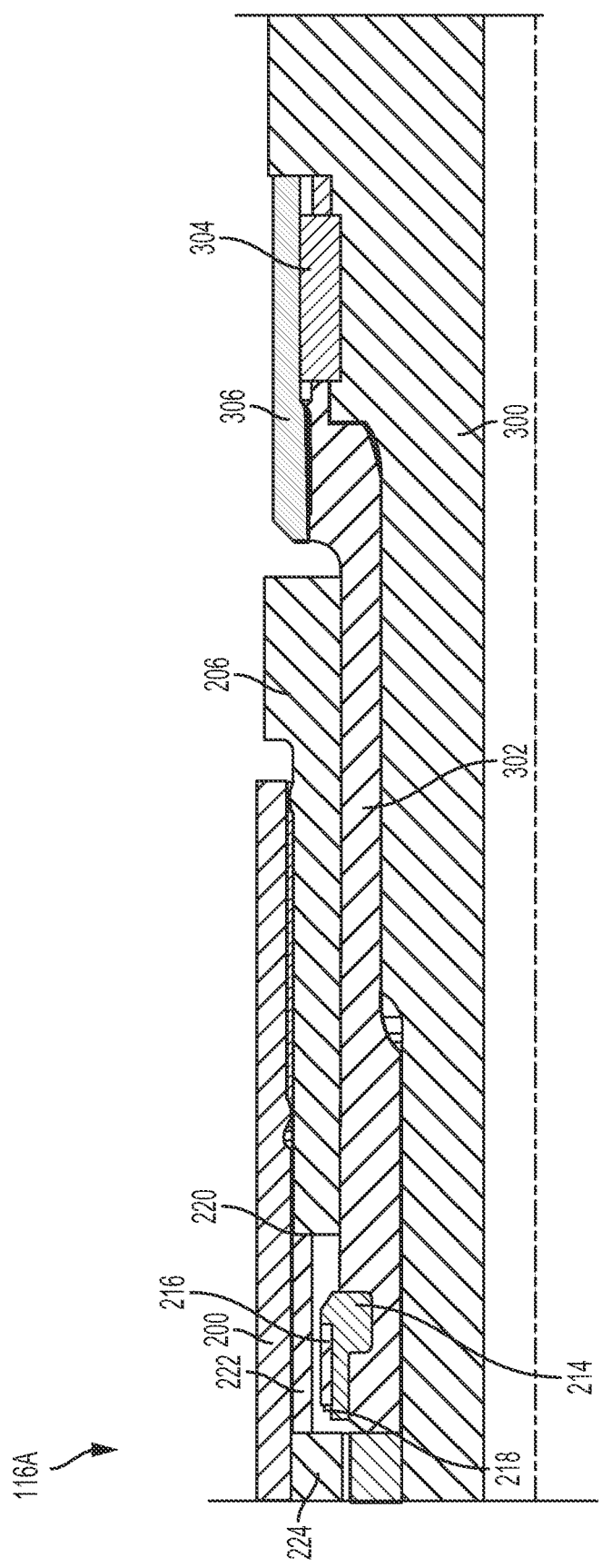
FIG. 3 is a cross-sectional view of a driveshaft transmission assembly that includes a coupling mechanism having locking pins according to another aspect of the present disclosure.

FIG. 3 shows an example of the driveshaft transmission assembly 116A that may be positioned in the downhole motor assembly 114 of the drilling system 100 in place of driveshaft transmission assembly 116 of FIG. 1. Driveshaft transmission assembly 116A includes a coupling mechanism using locking pins according to one aspect of the present disclosure. The driveshaft transmission assembly 116A also includes a driveshaft 300 internal to the bearing housing 200 and a shaft radial bearing sleeve 302 positioned between the driveshaft 300 and the stationary sleeve 206. A coupling mechanism may be used to couple the shaft radial bearing sleeve 302 to the driveshaft 300. The coupling mechanism may include locking pins 304 and a retention sleeve 306. The locking pins 304 may be received in openings 400 in the shaft radial bearing sleeve 302 (as further shown in FIGS. 4 and 6) and grooves 500 of the driveshaft 300 (as further shown in FIGS. 5 and 6). The retention sleeve may be coupled to the shaft radial bearing sleeve 302 to prevent radial movement of the locking pins 304.

Following separation of the driveshaft 300 at any position on the driveshaft 300 uphole of the position that the coupling mechanism couples the shaft radial bearing sleeve 302 to the driveshaft 300, the coupling mechanism may prevent loss of the driveshaft 300 downhole. The weight of the driveshaft 300 and driveshaft transmission assembly components attached thereto downhole of the coupling mechanism may axially load the shear length of the locking pins 304. The weight may load a downhole edge of the openings 400 in the shaft radial bearing sleeve 302. The load may be transferred to the catch assembly through the shaft radial bearing sleeve 302. The load may then be transferred to the stationary sleeve 206 which may be connected to the bearing housing 200.

Figure 4:
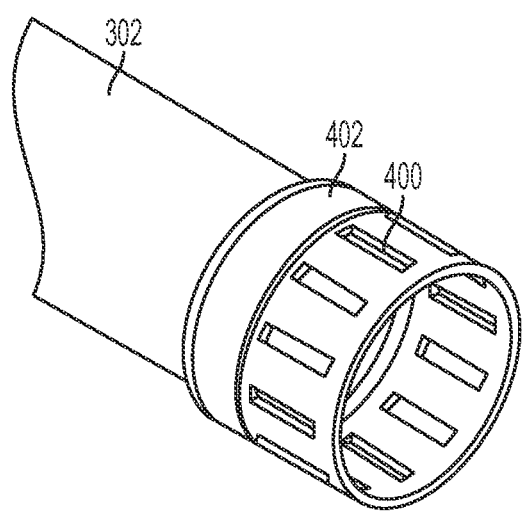
FIG. 4 is perspective view of a radial bearing assembly in the driveshaft transmission assembly of FIG. 3 according to one aspect of the present disclosure.
Figure 6:
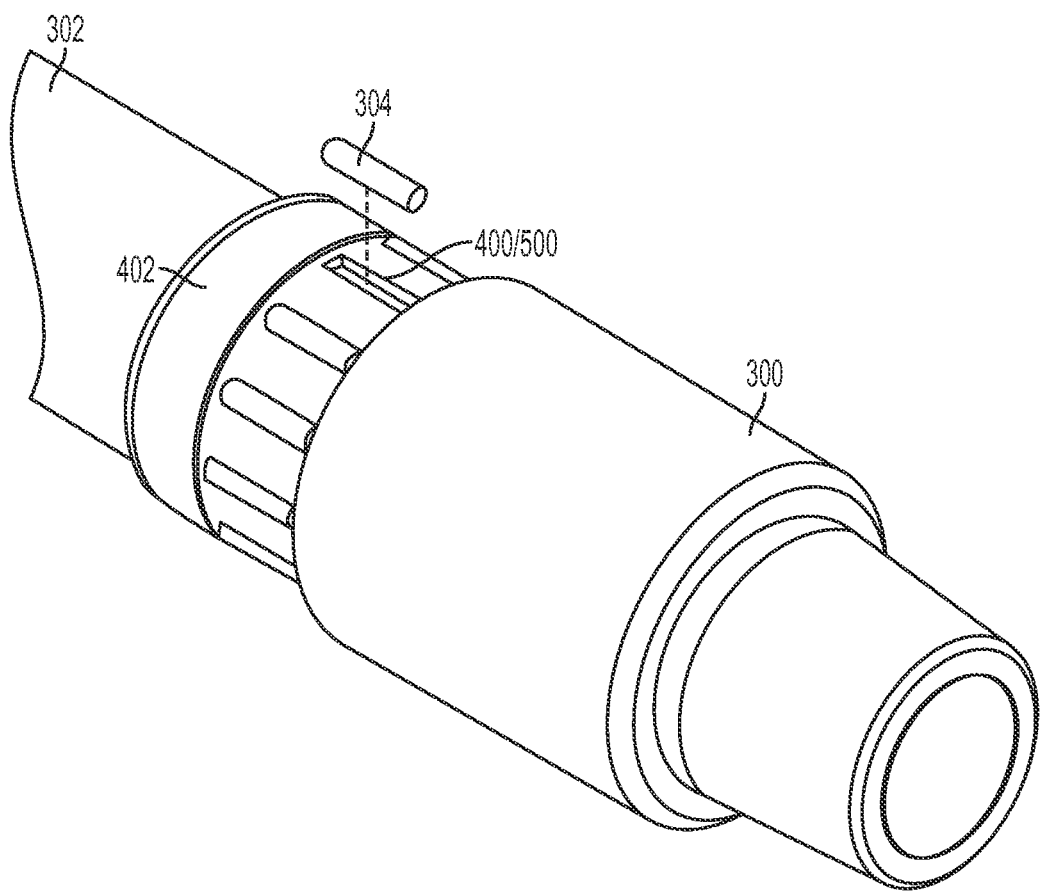
FIG. 6 is a perspective view of a driveshaft transmission assembly including a partially assembly coupling mechanism according to one aspect of the present disclosure.

FIG. 4 shows a perspective view of the shaft radial bearing sleeve 302 in FIG. 4. The shaft radial bearing sleeve 302 may include openings 400. The openings 400 may be machined or otherwise installed through a diameter of the shaft radial bearing sleeve 302. The openings 400 may be sized and shaped to receive the locking pins 304 of the coupling mechanism. For example, the locking pins 304 may be cylindrical and have a rectangular cross-sectional shape as shown in FIGS. 3 and 6. The openings 400 may have a length and width sufficient to allow the locking pins 304 to pass into the openings 400. The openings 400 may also have a shape corresponding to the cross-sectional shape of the locking pins 304 (e.g., rectangular) to allow the locking pins 304 to pass into the openings 400. In some aspects, the number of openings 400 may correspond to the number of locking pins 304 in the catch mechanism. In FIG. 4, the shaft radial bearing sleeve 302 includes twelve openings 400. But, the shaft radial bearing sleeve may include any number of openings 400 for any number of locking pins 304 without departing from the scope of the present disclosure. In some aspects, the shaft radial bearing sleeve 302 may also include pin threads 402. The pin threads 402 may correspond to pin threads on the retention sleeve 306 for coupling the retention sleeve 306 to the shaft radial bearing sleeve 302 to retain the locking pins 304 in the openings in the shaft radial bearing sleeve 302 and grooves 500 of the driveshaft 300.

Figure 5A:
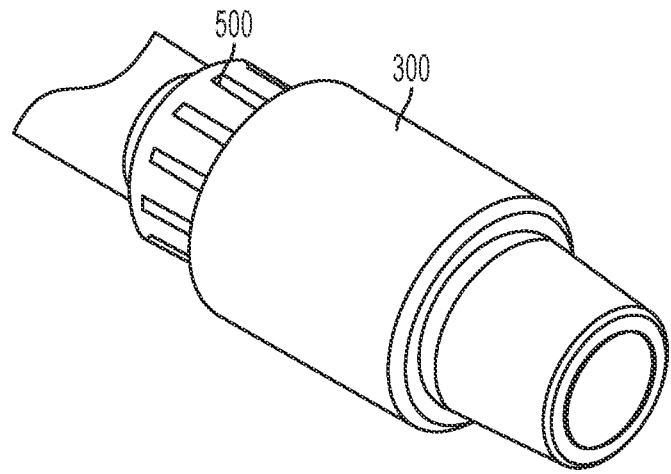
FIG. 5A is a perspective view of a driveshaft in the driveshaft transmission assembly of FIG. 3 according to one aspect of the present disclosure.
Figure 5B:
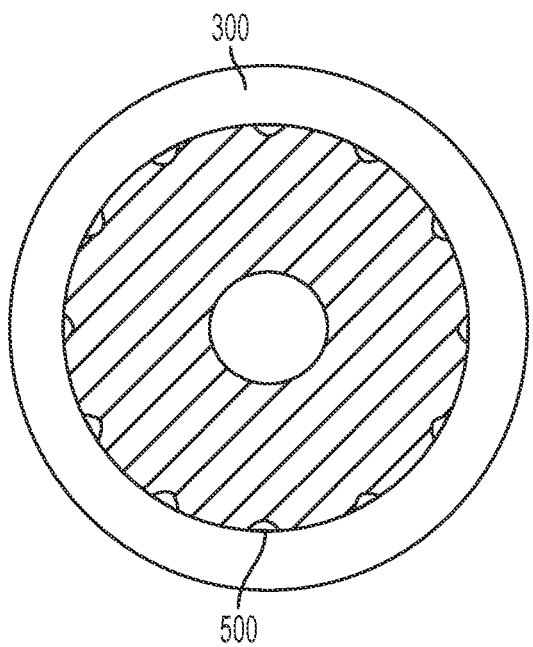
FIG. 5B is a cut-away view of the driveshaft of FIG. 5A according to one aspect of the present disclosure.

FIG. 5A shows a perspective view of the driveshaft 300 including the grooves 500. The grooves 500 may be machined or otherwise installed into an outer diameter of the driveshaft 300. Similar to the openings 400 in the shaft radial bearing sleeve 302, the grooves 500 may be sized to receive the locking pins 304 of the coupling mechanism. For example, the grooves 500 may have a length and width sufficient to receive the locking pins 304. The grooves 500 may also have a shape corresponding to the shape of the locking pins 304 to allow the locking pins 304 to be received in the grooves 500. For example, FIG. 5B shows the grooves 500 as cylindrical grooves for receiving cylindrical locking pins 304. The driveshaft 300 shown in FIGS. 5A and 5B includes twelve grooves 500 corresponding to the number openings shown in FIG. 4. But, the driveshaft may include any number of grooves 500 for any number of locking pins 304 and corresponding to any number of openings 400 without departing from the scope of the present disclosure.

During assembly of the driveshaft transmission assembly 116A, the driveshaft 300 and the shaft radial bearing sleeve 302 may be joined and positioned to align the openings 400 on the shaft radial bearing sleeve 302 with the grooves 500 of the driveshaft 300 as shown in FIG. 6. In some aspects, the inner diameter of the shaft radial bearing sleeve 302 having the openings 400 may slide over the outer diameter of the driveshaft 300 having the grooves 500. The locking pins 304 may be inserted into the openings 400 until they are received by the grooves 500. The retention sleeve 306 may be coupled to the shaft radial bearing sleeve 302 when all of the locking pins 304 are inserted into the openings 400 and grooves 500 to retain the locking pins 304 in the openings 400 and grooves 500.

Figure 7:
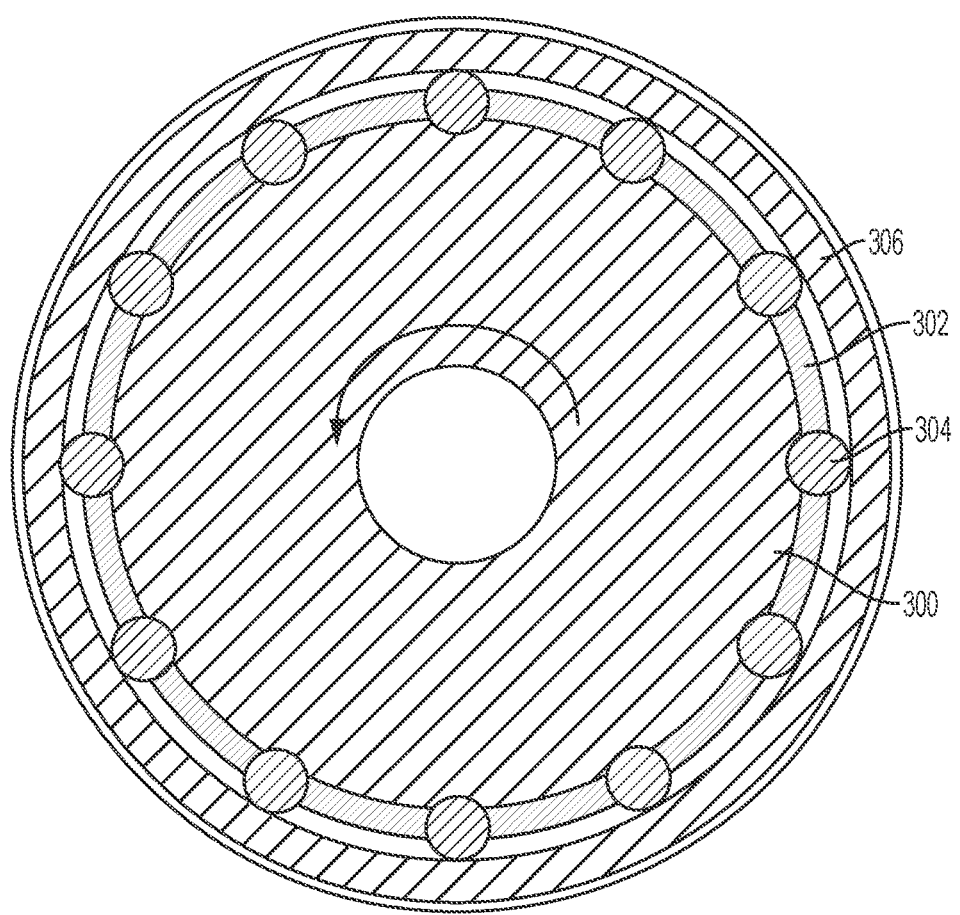
FIG. 7 is a cut-away view of the driveshaft transmission assembly of FIG. 3 according to one aspect of the present disclosure.

FIG. 7 shows a cut-away view of the locking pins 304 and retention sleeve 306 assembled on the driveshaft 300 and the shaft radial bearing sleeve 302. The locking pins 304 may prevent the driveshaft 300 and the shaft radial bearing sleeve 302 from moving relative to each other in the axial direction. The retention sleeve 306 may prevent relative rotation between the driveshaft 300 and shaft radial bearing sleeve 302 by shouldering against the driveshaft 300 or shaft radial bearing sleeve 302. The locking pins 304 may contact the side of the openings 400 in the shaft radial bearing assembly as the driveshaft 300 rotates. As the driveshaft 300 rotates, the locking pins 304 may attempt to roll up the grooves 500 of the driveshaft 300 and roll out, radially, from the openings 400. The locking pins 304 may contact an inner diameter of the retention sleeve 306 retaining the locking pins 304 in the openings 400 and grooves 500. The rotation of the driveshaft 300 may be transferred through the locking pins 304 to the side of the shaft radial bearing sleeve 302 to allow the driveshaft 300 and shaft radial bearing sleeve 302 to rotate together.

In some aspects, the driveshaft transmission assemblies are provided according to one or more of the following examples:

Example #1

A driveshaft transmission assembly may include a coupling mechanism external to a driveshaft for coupling a radial bearing assembly to the driveshaft.

Example #2

The driveshaft transmission assembly of Example 1 may feature the coupling mechanism being separate from the radial bearing assembly and the driveshaft. The coupling mechanism may be positionable on the radial bearing assembly to prevent rotation and axial movement of the radial bearing assembly relative to the driveshaft.

Example #3

The driveshaft transmission assembly of Examples #1 or 2 may feature the coupling mechanism including a bearing cap. An uphole portion of the bearing cap may be positionable radially adjacent to a downhole portion of the radial bearing assembly to couple the radial bearing assembly to the driveshaft using an interference fit.

Example #4

The driveshaft transmission assembly of Example #3 may feature the downhole portion of the radial bearing assembly being positionable between the driveshaft and the uphole portion of the bearing cap.

Example #5

The driveshaft transmission assembly of Example #3 may feature a downhole edge of the bearing cap being positionable proximate to a downhole shoulder on the driveshaft to create a gap between the downhole edge of the bearing cap and the downhole shoulder of the driveshaft.

Example #6

The driveshaft transmission assembly of Examples #1-5 may feature the coupling mechanism including locking pins positionable in grooves of the driveshaft and openings in the radial bearing assembly to couple the radial bearing assembly to the driveshaft. The coupling mechanism may further feature a retention sleeve positionable external to the radial bearing assembly to retain the locking pins in the grooves of the driveshaft and the openings in the radial bearing assembly.

Example #7

The driveshaft transmission assembly of Examples #1-6 may feature the radial bearing assembly having a catch assembly for preventing a loss of driveshaft transmission assembly components downhole subsequent to a component of the driveshaft transmission assembly separating. The coupling mechanism may be positionable to prevent the driveshaft from falling downhole subsequent to the component of the driveshaft transmission assembly separating by coupling the radial bearing assembly to the driveshaft.

Example #8

A driveshaft transmission assembly may feature a radial bearing assembly coupled to a driveshaft by a coupling mechanism. The coupling mechanism may be separate from the radial bearing assembly and the driveshaft and may be external to the driveshaft.

Example #9

The driveshaft transmission assembly of Example #8 may feature the radial bearing assembly including a downhole portion. The coupling mechanism may include a bearing cap. The bearing cap may include an uphole portion for creating an interference fit with the downhole portion of the radial bearing assembly.

Example #10

The driveshaft transmission assembly of Example #9 may feature the downhole portion of the radial bearing assembly including a nonlinear surface for resisting torque between the bearing cap and the driveshaft.

Example #11

The driveshaft transmission assembly of Example #9 may feature the bearing cap including a downhole edge positioned proximate to a downhole shoulder of the driveshaft to create a gap between the downhole edge of the bearing cap and the downhole shoulder of the driveshaft.

Example #12

The driveshaft transmission assembly of Example #8-11 may feature the coupling mechanism including locking pins and a retention sleeve. The radial bearing assembly may include openings sized to receive the locking pins. The openings may be positioned to align with grooves of the driveshaft. The locking pins may be positioned in the openings in the radial bearing assembly and the grooves of the driveshaft. The retention sleeve may be positioned external to the radial bearing assembly and the driveshaft to retain the locking pins in the openings in the radial bearing assembly and the grooves of the driveshaft.

Example #13

The driveshaft transmission assembly of Examples #8-12 may feature the coupling mechanism being positioned on the radial bearing assembly to prevent rotation of the radial bearing assembly relative to the driveshaft.

Example #14

The driveshaft transmission assembly of Examples #8-13 may feature the radial bearing assembly including a catch assembly for preventing a loss of driveshaft transmission assembly components downhole subsequent to a component of the driveshaft transmission assembly separating.

Example #15

A driveshaft transmission assembly may include a driveshaft, a radial bearing assembly, and a coupling mechanism. The coupling mechanism may be separate from the driveshaft and the radial bearing assembly for coupling the radial bearing assembly to the driveshaft. The coupling mechanism may be positionable on the radial bearing assembly to prevent rotation and axial movement of the radial bearing assembly relative to the driveshaft.

Example #16

The driveshaft transmission assembly of Example #15 may feature the coupling mechanism including locking pins and a retention sleeve. The driveshaft may include grooves shaped to receive the locking pins. The radial bearing assembly may include openings positionable proximate to the grooves of the driveshaft and shaped to receive the locking pins. The radial bearing assembly may further include pin threads for coupling the retention sleeve to retain the locking pins in the grooves of the driveshaft and the openings in the radial bearing assembly.

Example #17

The driveshaft transmission assembly of Example #16 may feature the locking pins being positionable in the grooves and the openings to prevent the axial movement of the radial bearing assembly relative to the driveshaft. At least a portion of the retention sleeve may be positionable against the driveshaft to prevent the rotation of the radial bearing assembly relative to the driveshaft.

Example #18

The driveshaft transmission assembly of Example #16 may feature the locking pins being cylindrical and have a rectangular cross-sectional shape. The grooves of the driveshaft may be cylindrical. The openings in the radial bearing assembly may be rectangular.

Example #19

The driveshaft transmission assembly of Example #16 may feature the radial bearing assembly including a catch assembly to prevent a loss of driveshaft transmission assembly components downhole subsequent to a component of the driveshaft transmission assembly separating. The locking pins may include a shear length for axial loading by a weight of the driveshaft transmission assembly components subsequent to the component of the driveshaft transmission assembly separating.

Example #20

The driveshaft transmission assembly of Example #15-19 may include the driveshaft including a downhole shoulder. The radial bearing assembly may include a downhole portion. The coupling mechanism may include a bearing cap having an uphole portion and a downhole edge. The uphole portion of the bearing cap may be positionable to couple the radial bearing assembly to the driveshaft by creating an interference fit with the downhole portion of the radial bearing assembly. The downhole edge of the bearing cap may be positionable proximate to the downhole shoulder of the driveshaft to create a gap between the downhole edge of the bearing cap and the downhole shoulder of the driveshaft.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A driveshaft transmission assembly, comprising:
a radial bearing assembly including a shaft radial bearing sleeve;
a catch assembly radially positioned between the shaft radial bearing sleeve and a spacer sleeve, the catch assembly being movable in a downhole direction to interfere with a contact shoulder in response to a component of the driveshaft transmission assembly separating; and
a coupling mechanism external to a driveshaft for coupling the radial bearing assembly to the driveshaft, wherein the driveshaft is coupled to a drill bit for drilling a wellbore.

2. The driveshaft transmission assembly of claim 1, wherein the coupling mechanism is separate from the radial bearing assembly and the driveshaft and is positionable on the radial bearing assembly to prevent rotation and axial movement of the radial bearing assembly relative to the driveshaft.

3. The driveshaft transmission assembly of claim 1, wherein the coupling mechanism includes a bearing cap, an uphole portion of the bearing cap being positionable radially adjacent to a downhole portion of the radial bearing assembly to couple the radial bearing assembly to the driveshaft using an interference fit.

4. The driveshaft transmission assembly of claim 3, wherein the downhole portion of the radial bearing assembly is positionable between the driveshaft and the uphole portion of the bearing cap.

5. The driveshaft transmission assembly of claim 3, wherein a downhole edge of the bearing cap is positionable proximate to a downhole shoulder on the driveshaft to create a gap between the downhole edge of the bearing cap and the downhole shoulder of the driveshaft.

6. The driveshaft transmission assembly of claim 1, wherein the coupling mechanism includes:
locking pins positionable in grooves of the driveshaft and openings in the radial bearing assembly to couple the radial bearing assembly to the driveshaft; and
a retention sleeve positionable external to the radial bearing assembly to retain the locking pins in the grooves of the driveshaft and the openings in the radial bearing assembly.

7. The driveshaft transmission assembly of claim 1, wherein the catch assembly is for preventing a loss of driveshaft transmission assembly components downhole subsequent to the component of the driveshaft transmission assembly separating, and
wherein the coupling mechanism is for preventing the driveshaft from falling downhole subsequent to the component of the driveshaft transmission assembly separating by coupling the radial bearing assembly to the driveshaft.

8. A driveshaft transmission assembly, comprising:
a driveshaft coupled to a drill bit for drilling a wellbore;
a radial bearing assembly;
a coupling mechanism that is external to the driveshaft for coupling the radial bearing assembly to the driveshaft, the coupling mechanism being for preventing the driveshaft from falling downhole subsequent to a separation of the driveshaft transmission assembly, the coupling mechanism being separate from the radial bearing assembly and the driveshaft; and
a catch assembly coupled to the radial bearing assembly, wherein the catch assembly is movable in a downhole direction to interfere with a contact shoulder in response to a separation of the driveshaft transmission assembly.

9. The driveshaft transmission assembly of claim 8, wherein the radial bearing assembly includes a downhole portion,
wherein the coupling mechanism includes a bearing cap, the bearing cap including an uphole portion for creating an interference fit with the downhole portion of the radial bearing assembly.

10. The driveshaft transmission assembly of claim 9, wherein the downhole portion of the radial bearing assembly includes a nonlinear surface for resisting torque between the bearing cap and the driveshaft.

11. The driveshaft transmission assembly of claim 9, wherein the bearing cap includes a downhole edge positioned proximate to a downhole shoulder of the driveshaft to create a gap between the downhole edge of the bearing cap and the downhole shoulder of the driveshaft.

12. The driveshaft transmission assembly of claim 8, wherein the coupling mechanism includes locking pins and a retention sleeve,
    wherein the radial bearing assembly includes openings sized to receive the locking pins, the openings being positioned to align with grooves of the driveshaft,
    wherein the locking pins are positioned in the openings in the radial bearing assembly and the grooves of the driveshaft, and
    wherein the retention sleeve is positioned external to the radial bearing assembly and the driveshaft to retain the locking pins in the openings in the radial bearing assembly and the grooves of the driveshaft.

13. The driveshaft transmission assembly of claim 8, wherein the coupling mechanism is positioned on the radial bearing assembly to prevent rotation of the radial bearing assembly relative to the driveshaft.

14. The driveshaft transmission assembly of claim 8, wherein the catch assembly is for preventing a loss of driveshaft transmission assembly components downhole subsequent to a component of the driveshaft transmission assembly separating.

15. A driveshaft transmission assembly, comprising:
    a driveshaft coupled to a drill bit for drilling a wellbore;
    a radial bearing assembly; and
    a coupling mechanism separate from the driveshaft and the radial bearing assembly for affixing a shaft radial bearing sleeve of the radial bearing assembly to the driveshaft so as to prevent rotation of the shaft radial bearing sleeve relative to the driveshaft, the coupling mechanism being external to and positioned coaxially around the driveshaft and the shaft radial bearing sleeve.

16. The driveshaft transmission assembly of claim 15, wherein the coupling mechanism includes locking pins and a retention sleeve,
    wherein the driveshaft includes grooves shaped to receive the locking pins,
    wherein the radial bearing assembly includes openings positionable proximate to the grooves of the driveshaft and shaped to receive the locking pins, the radial bearing assembly further including pin threads for coupling the retention sleeve to retain the locking pins in the grooves of the driveshaft and the openings in the radial bearing assembly.

17. The driveshaft transmission assembly of claim 16, wherein the locking pins are positionable in the grooves and the openings to prevent axial movement of the radial bearing assembly relative to the driveshaft,
    wherein at least a portion of the retention sleeve is positionable against the driveshaft to prevent the rotation of the radial bearing assembly relative to the driveshaft.

18. The driveshaft transmission assembly of claim 16, wherein the locking pins are cylindrical and have a rectangular cross-sectional shape,
    wherein the grooves of the driveshaft are cylindrical,
    wherein the openings in the radial bearing assembly are rectangular.

19. The driveshaft transmission assembly of claim 16, wherein the radial bearing assembly includes a catch assembly to prevent a loss of driveshaft transmission assembly components downhole subsequent to a component of the driveshaft transmission assembly separating, and
    wherein the locking pins include a shear length for axial loading by a weight of the driveshaft transmission assembly components subsequent to the component of the driveshaft transmission assembly separating.

20. The driveshaft transmission assembly of claim 15, wherein the driveshaft includes a downhole shoulder,
    wherein the radial bearing assembly includes a downhole portion,
    wherein the coupling mechanism includes a bearing cap having an uphole portion and a downhole edge,
        the uphole portion of the bearing cap being positionable to couple the radial bearing assembly to the driveshaft by creating an interference fit with the downhole portion of the radial bearing assembly, and
        the downhole edge of the bearing cap being positionable proximate to the downhole shoulder of the driveshaft to create a gap between the downhole edge of the bearing cap and the downhole shoulder of the driveshaft.

* * * * *